US012701289B2

(12) United States Patent
Lee et al.

(10) Patent No.: US 12,701,289 B2
(45) Date of Patent: Aug. 4, 2026

(54) METHOD AND APPARATUS FOR TRANSMITTING ARTIFICIAL INTELLIGENCE-BASED DATA BY USING DISTRIBUTED NETWORK

(71) Applicant: Electronics and Telecommunications Research Institute, Daejeon (KR)

(72) Inventors: Changkyu Lee, Daejeon (KR); Mi Young Huh, Sejong-si (KR); Wook Hyun, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 30 days.

(21) Appl. No.: 18/742,062

(22) Filed: Jun. 13, 2024

(65) Prior Publication Data

US 2025/0024096 A1 Jan. 16, 2025

(30) Foreign Application Priority Data

| | | |
|---|---|---|
| Jul. 13, 2023 | (KR) | .......................... 10-2023-0091057 |
| Sep. 25, 2023 | (KR) | .......................... 10-2023-0128433 |
| Mar. 28, 2024 | (KR) | .......................... 10-2024-0042797 |

(51) Int. Cl.
   *H04N 21/44* (2011.01)
   *H04N 21/436* (2011.01)

(52) U.S. Cl.
   CPC ..... *H04N 21/44008* (2013.01); *H04N 21/436* (2013.01)

(58) Field of Classification Search
   CPC ...................... H04N 21/436; H04N 21/44008
   See application file for complete search history.

(56) References Cited

U.S. PATENT DOCUMENTS

| | | | | |
|---|---|---|---|---|
| 6,839,339 | B1 * | 1/2005 | Chuah ..................... | H04L 69/04 |
| | | | | 370/477 |
| 10,116,970 | B1 * | 10/2018 | Banerjee ............ | H04N 21/2343 |
| 2021/0099384 | A1 * | 4/2021 | Hyun .................... | H04L 67/141 |
| 2021/0329306 | A1 * | 10/2021 | Liu ...................... | G06V 40/168 |

FOREIGN PATENT DOCUMENTS

| | | |
|---|---|---|
| CN | 113205456 A | 8/2021 |
| CN | 115037696 A | 9/2022 |
| KR | 10-2023-0097336 A | 7/2023 |

OTHER PUBLICATIONS

Lee, Changkyu "Q.HP2P-fvtp: proposed description on parameters." SG11-Cn. Study Group 11. International Telecommunication Union. Telecommunication Standardization Sector. Study Period 2022-2024. Geneva, Oct. 10-20, 2023.

* cited by examiner

*Primary Examiner* — Nnenna N Ekpo
(74) *Attorney, Agent, or Firm* — BROADVIEW IP LAW, PC

(57) ABSTRACT

Disclosed are a method and apparatus for transmitting artificial intelligence-based data by using a distributed network. An operating method of a first agent includes transmitting a key frame of an input video received from a first client corresponding to the first agent to a second agent and receiving, from the first client, key points extracted from the input video as features for every frame after the key frame and transmitting the received key points to the second agent. The first agent and the second agent communicate through a distributed network.

10 Claims, 14 Drawing Sheets

| Name of field | Internal configuration of field |
|---|---|
| Header | <pre>{<br>  "req-code": NUMBER,<br>  "req-params": {<br>  "operation": {<br>    "ack": BOOLEAN},<br>  "peer": {<br>    "peer-id": STRING,<br>    "sequence": NUMBER},<br>  "ext-header-len": NUMBER,<br>  "payload": {<br>    "length": NUMBER,<br>    "payload-type": STRING}<br>  }<br>}</pre> |
| Extension header | <pre>{<br>    "channel-id": STRING,<br>    "media-type": STRING,<br>    "source-id":STRING,<br>    "sequence":NUMBER<br>}</pre> |
| Payload | Binary data |

FIG. 5

| Name of field | Internal configuration of field |
|---|---|
| Header | {<br>"req-code": NUMBER,<br> "req-params": {<br>  "operation": {<br>  "ack": BOOLEAN},<br>  "peer": {<br>   "peer-id": STRING,<br>    "sequence": NUMBER },<br>  "ext-header-len": NUMBER,<br>  "payload": {<br>   "length": NUMBER,<br>   "payload-type": STRING }<br>  }<br> } |
| Extension header | {<br>"channel-id": STRING,<br>"media-type":STRING<br>} |
| Payload | Binary data |

FIG. 6

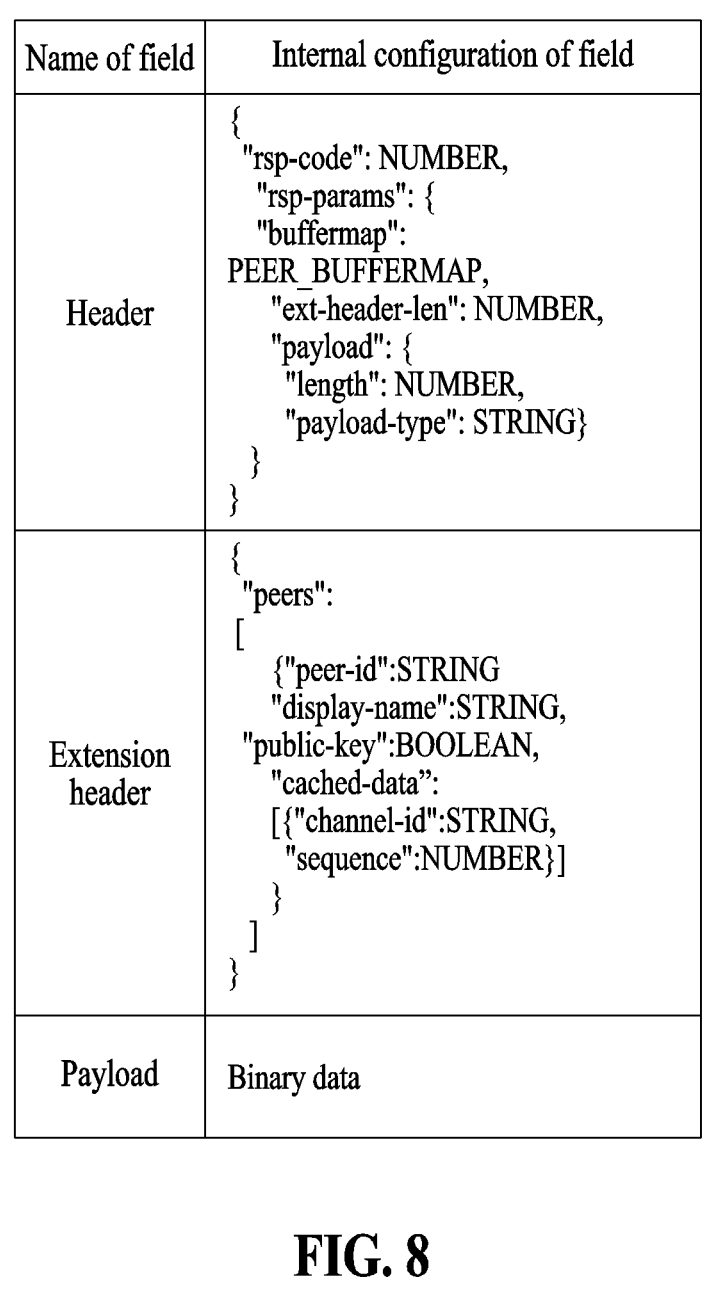

| Name of field | Internal configuration of field |
|---|---|
| Header | {<br>  "rsp-code": NUMBER,<br>  "rsp-params": {<br>  "buffermap":<br>PEER_BUFFERMAP,<br>    "ext-header-len": NUMBER,<br>    "payload": {<br>      "length": NUMBER,<br>      "payload-type": STRING}<br>    }<br> } |
| Extension header | {<br>  "peers":<br>[<br>    {"peer-id":STRING<br>    "display-name":STRING,<br>  "public-key":BOOLEAN,<br>    "cached-data":<br>    [{"channel-id":STRING,<br>     "sequence":NUMBER}]<br>    }<br>  ]<br> } |
| Payload | Binary data |

FIG. 8

| Name of field | Internal configuration of field |
|---|---|
| Header | {<br>  "req-code": NUMBER,<br>  "req-params": {<br>    "overlay-id": STRING,<br>    "source-id": STRING,<br>    "sequence": NUMBER,<br>    "ext-header-len": NUMBER<br>  }<br>} |
| Extension header | {<br>"channel-id": STRING<br>} |

FIG. 9

| Name of field | Internal configuration of field |
|---|---|
| Header | {<br>"rsp-code": NUMBER,<br>"rsp-params": {<br>  "peer": {<br>     "peer-id": STRING},<br>    "sequence": NUMBER,<br>     "ext-header-len": NUMBER,<br>     "payload": {<br>      "length": NUMBER,<br>       "payload-type": STRING}<br>    }<br>}<br>} |
| Extension header | {<br>"channel-id":STRING<br>"media-type":STRING<br>} |
| Payload | Binary data |

FIG. 10

| Name of field | Internal configuration of field |
|---|---|
| Header | ```{<br>  "req-code": NUMBER,<br>  "req-params": {<br>    "operation": {<br>    "ack": BOOLEAN},<br>    "peer": {<br>      "peer-id": STRING,<br>        "sequence": NUMBER},<br>    "ext-header-len": NUMBER,<br>    "payload": {<br>        "length": NUMBER,<br>        "payload-type": STRING}<br>      }<br>  }``` |
| Extension header | ```{<br>  "channel-id": STRING,<br>  "media-type": STRING,<br>  "source-id": STRING,<br>  "sequence": NUMBER<br>  }``` |
| Payload | Binary data |

FIG. 11

METHOD AND APPARATUS FOR TRANSMITTING ARTIFICIAL INTELLIGENCE-BASED DATA BY USING DISTRIBUTED NETWORK

CROSS-REFERENCE TO RELATED APPLICATION(S)

This application claims the priority benefit of Korean Patent Application No. 10-2023-0091057 filed on Jul. 13, 2023, of Korean Patent Application No. 10-2023-0128433 filed on Sep. 25, 2023, and of Korean Patent Application No. 10-2024-0042797 filed on Mar. 28, 2024, in the Korean Intellectual Property Office, the disclosures of which are incorporated herein by reference for all purposes.

BACKGROUND

1. Field

One or more embodiments relate to a method and apparatus for transmitting artificial intelligence-based data by using a distributed network.

2. Description of Related Art

A distributed network is a virtual network including terminals that are geographically apart from one another and is used in data sharing and multimedia streaming services. In a distributed network, data may be transmitted from a source node having the data to some terminals, and then, the data may be transmitted from those terminals to other terminals. Specifically, in a multimedia streaming service provided through a distributed network, a multimedia stream where a source node is stored or generated is transmitted to terminals in the distributed network, and, in this process, a method is required to transmit high-capacity data at a low latency.

Meanwhile, research on technology for generating video using artificial intelligence has been underway. Specifically, technology for generating video based on reference information may be used to generate videos based on a reference image or feature information that serves as a reference for video generation. A signaling method and a message format are required to transmit reference information and provide a multimedia streaming service based on the reference information such that high-capacity video data is transmitted at a low latency by using a distributed network.

SUMMARY

According to an aspect, there is provided an operating method of a first agent including transmitting a key frame of an input video received from a first client corresponding to the first agent to a second agent and receiving, from the first client, key points extracted from the input video as features for every frame after the key frame and transmitting the received key points to the second agent, in which the first agent and the second agent communicate through a distributed network.

The key frame may be a first frame when an angle and/or position of an object comprised in the input video changes.

The key points may include a coordinate value for at least one of an eye, nose, mouth, ear, or jawline of a face included in the input video.

The operating method of a first agent may further include opening a session for video transmission between the first client and a hybrid overlay management server (HOMS)

configured to manage the first agent and the second agent, in which a distributed network between the first agent and the second agent is generated in response to the second agent joining the session.

A second client corresponding to the second agent may generate the input video based on the key frame and a frame generated from the key points received through the second agent.

According to another aspect, there is provided an operating method of a second agent including receiving a key frame of an input video from a first agent and transmitting the received key frame to a second client corresponding to the second agent, receiving, from the first agent, key points extracted from the input video as features for every frame after the key frame and transmitting the received key points to the second client, in which the second client generates a plurality of frames by combining the key points with the key frames and generates the input video based on the generated plurality of frames.

According to another aspect, there is provided an operating method of a first agent including transmitting a reference image received from a first client corresponding to a first agent to a second agent and receiving, from the first client, feature vectors representing every frame extracted through a neural network and transmitting the received feature vectors to the second agent, in which the first agent and the second agent communicate through a distributed network.

The second agent may determine whether a message is the latest message based on a sequence and peer identification (ID) of a header field of the message received from the first agent, may discard the message when the message is not the latest message, may verify integrity of data in a payload field of the message when the message is the latest message, may determine whether to store the data in the payload field of the message based on a media type and channel ID of an extension header field of the message in response to the integrity of the data being verified, and may transmit data, excluding a digital signature, of the data in the payload field to a second client.

The verifying of the integrity of the data may include calculating a hash value for the data, excluding a digital signature, of the data in the payload field of the message, decrypting the digital signature in the payload field by using a public key of the first agent, and verifying the integrity of the data based on whether a result of decrypting the digital signature is the same as the hash value.

The public key may be transmitted from the first agent to the second agent while the first agent and the second agent are exchanging a SET_PRIMARY request message and a SET_PRIMARY response message.

The determining whether to store the data in the payload field of the message may include storing a digital signature and the data in the payload field when the media type is set to data cache and not storing the data in the payload field when the media type is set to data or control.

If there is a child agent of the second agent, the second agent may forward a message received from the first agent to the child agent.

When a new third agent accesses the distributed network, the third agent may transmit a SET_PRIMARY request message to the second agent, may receive, from the second agent, a SET_PRIMARY response message corresponding to the SET_PRIMARY request message, may transmit a GET_DATA request message requesting the transmission of images retained by the second agent, based on the SET_PRIMARY response message, may receive, from the second agent, a GET_DATA response message according to the GET_DATA request message, and may store an image and a digital signature included in the GET_DATA response message.

The third agent may enter a waiting state when confirming that the second agent does not retain any image, based on the SET_PRIMARY response message.

According to another aspect, there is provided a first agent including one or more processors, in which the one or more processors are configured to transmit a key frame of an input video received from a first client corresponding to the first agent to a second agent and receive, from the first client, key points extracted from the input video as features for every frame after the key frame and transmit the received key points to the second agent, in which the first agent and the second agent communicate through a distributed network.

The key frame may be a first frame when an angle and/or position of an object comprised in the input video changes.

The key points may include a coordinate value for at least one of an eye, nose, mouth, ear, or jawline of a face included in the input video.

The one or more processors may open a session for video transmission between the first client and a HOMS configured to manage the first agent and the second agent, in which a distributed network between the first agent and the second agent is generated in response to the second agent joining the session.

A second client corresponding to the second agent may generate the input video based on the key frame and a frame generated from the key points received through the second agent.

According to an embodiment, artificial intelligence-based video may be transmitted at a low latency to a significant number of viewers by using a distributed network.

According to another embodiment, a communication method and a message format may be provided such that, by transmitting a key frame and key points or a reference image and feature vectors from a transmission client to a receiving client through a distributed network, high-capacity data may be transmitted at a low latency and a multimedia streaming service may be effectively provided.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIG. 5 is a diagram illustrating a message format for transmitting a new image, according to an embodiment;

FIG. 6 is a diagram illustrating a message format for transmitting a feature, according to an embodiment;

FIG. 8 is a diagram illustrating a SET_PRIMARY response message format for retransmitting an image, according to an embodiment;

FIG. 9 is a diagram illustrating a GET_DATA request message format for retransmitting an image, according to an embodiment;

FIG. 10 is a diagram illustrating a GET_DATA response message format for retransmitting an image, according to an embodiment;

FIG. 11 is a diagram illustrating a BROADCAST_DATA request message format for retransmitting an image, according to an embodiment;

DETAILED DESCRIPTION

Figure 1:
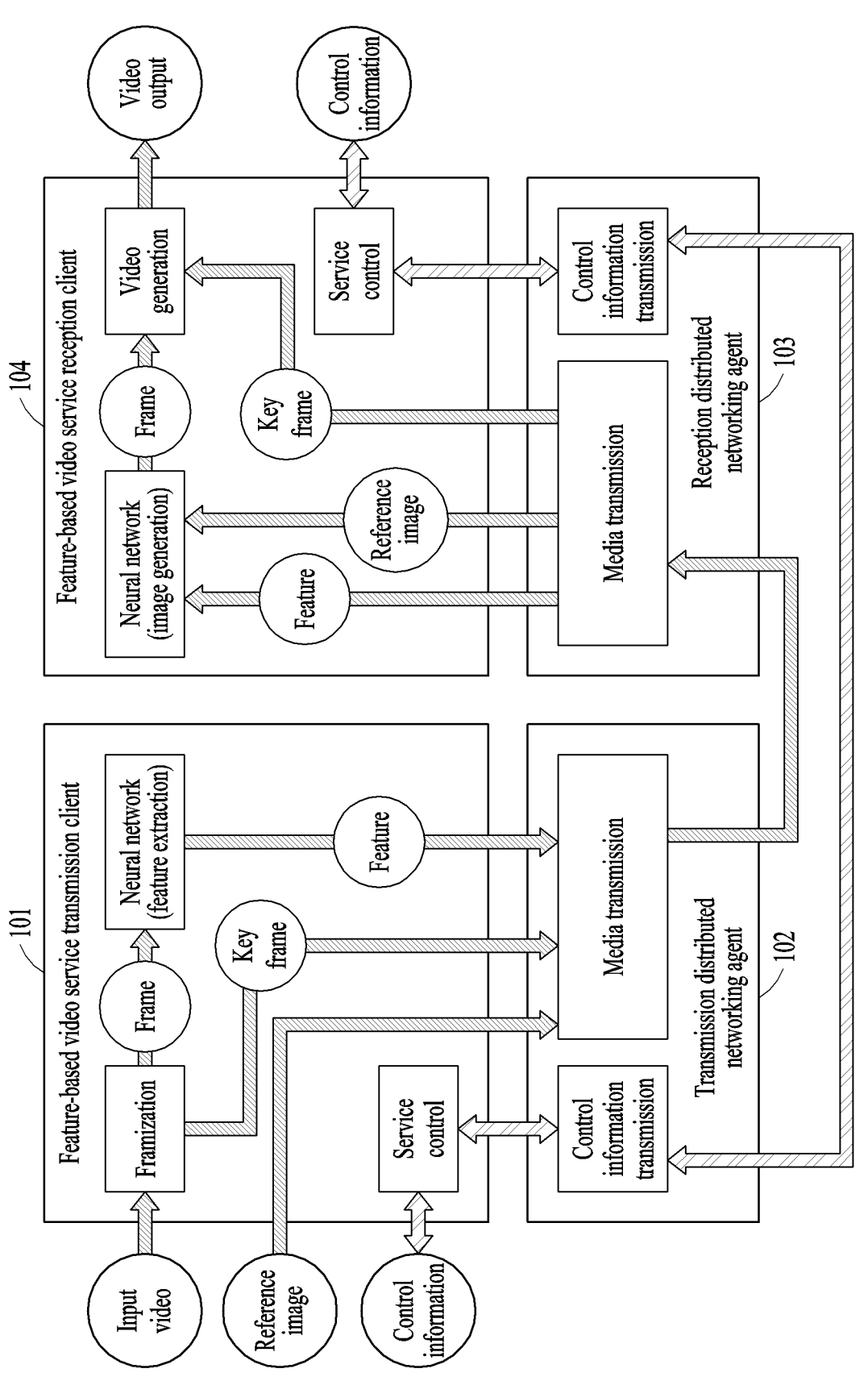
FIG. 1 is a diagram illustrating a method of transmitting artificial intelligence-based video by using a distributed network, according to an embodiment.

The following detailed structural or functional description is provided as an example only and various alterations and modifications may be made to embodiments. Here, the embodiments are not construed as limited to the disclosure and should be understood to include all changes, equivalents, and replacements within the idea and the technical scope of the disclosure.

As used herein, "A or B", "at least one of A and B", "at least one of A or B", "A, B or C", "at least one of A, B and C", "at least one of A, B, or C", and "one or a combination of at least two of A, B, and C," each of which may include any one of the items listed together in the corresponding one of the phrases, or all possible combinations thereof. Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating a method of transmitting artificial intelligence-based video by using a distributed network, according to an embodiment.

Referring to FIG. 1, an artificial intelligence-based video transmission system using a distributed network may include a feature-based video service transmission client 101, a transmission distributed networking agent 102, a reception distributed networking agent 103, a feature-based video service reception client 104. For ease of description, herein, the feature-based video service transmission client 101 may be referred to as the transmission client 101, the transmission distributed networking agent 102 may be referred to as the transmission agent 102, the reception distributed networking agent 103 may be referred to as the reception agent 103, and the feature-based video service reception client 104 may be referred to as the reception client 104. Both a client and an agent are implemented at an application level, in which the client may be a part that interacts with a user, and the agent may be a part that performs a protocol operation for information exchange and the configuration of a distributed network. The agent may be a hybrid peer-to-peer (HP2P) agent.

According to an embodiment, the transmission client 101 may divide each frame of an input video, may extract features of each frame through a neural network, and may transmit the features to the reception client 104 through communication between the transmission agent 102 and the reception agent 103.

The reception client 104 may generate frames from the received features, may generate video by combining the generated frames, and may output the video.

In this case, for smooth video generation, a key frame of the input video may be transmitted. The key frame may be a first frame when an angle and/or position of an object included in the input video changes and may be the first frame when a sudden change occurs in the input video, for example, when an angle or position of a face changes.

When the key frame is transmitted, features may be extracted from each of the frames after the key frame in the form of key points and may be transmitted from the transmission client 101 to the reception client 104. The key points may be, for example, a list of two-dimensional (2D) coordinate values for at least one of an eye, nose, mouth, ear, or jawline of a face included in the input video.

In addition, for a service control, control information may be exchanged between the transmission agent 102 and the reception agent 103.

For example, the control information may include JOIN_NOTIFICATION notifying that a user has joined a service session, LEAVE_NOTIFICATION notifying that a user has left the service session, TRANSMISSION_CON-TROL_NOTIFICATION providing service session user information having video transmission authority, OWNER-SHIP NOTIFICATION notifying that a person having the authority of control of the service session has changed, SESSION_INFO_NOTIFICATION notifying that the information of the service session has changed, EXPULSION_NOTIFICATION notifying a list of users to be expulsed from the service session, or SESSION_TER-M_NOTIFICATION notifying that the service session has been terminated, but examples are not limited to the foregoing examples.

According to another embodiment, instead of the key frame, a reference image for generating video according to an artificial intelligence method may be transmitted from the transmission client 101 to the reception client 104. When the reference image is used, the input video is not required.

When the reference image is transmitted, features in every frame of the input video may be extracted in the form of feature vectors, and the extracted feature vectors may be transmitted from the transmission client 101 to the reception client 104. A feature vector may be a vector value extracted from each of a plurality of frames of an input video through a neural network.

The input video refers to a target video intended to be transmitted, but the reference image is a reference for generating video based on the feature vectors in the reception client 104 and may be distinguished from the target video to be intended to be transmitted. According to embodiments, the reference image may be an image transmitted by a transmission client, an image retained by a reception client, or an image retrieved from a third-party storage.

In addition, for a service control, control information may be exchanged between the transmission agent 102 and the reception agent 103.

Figure 2:
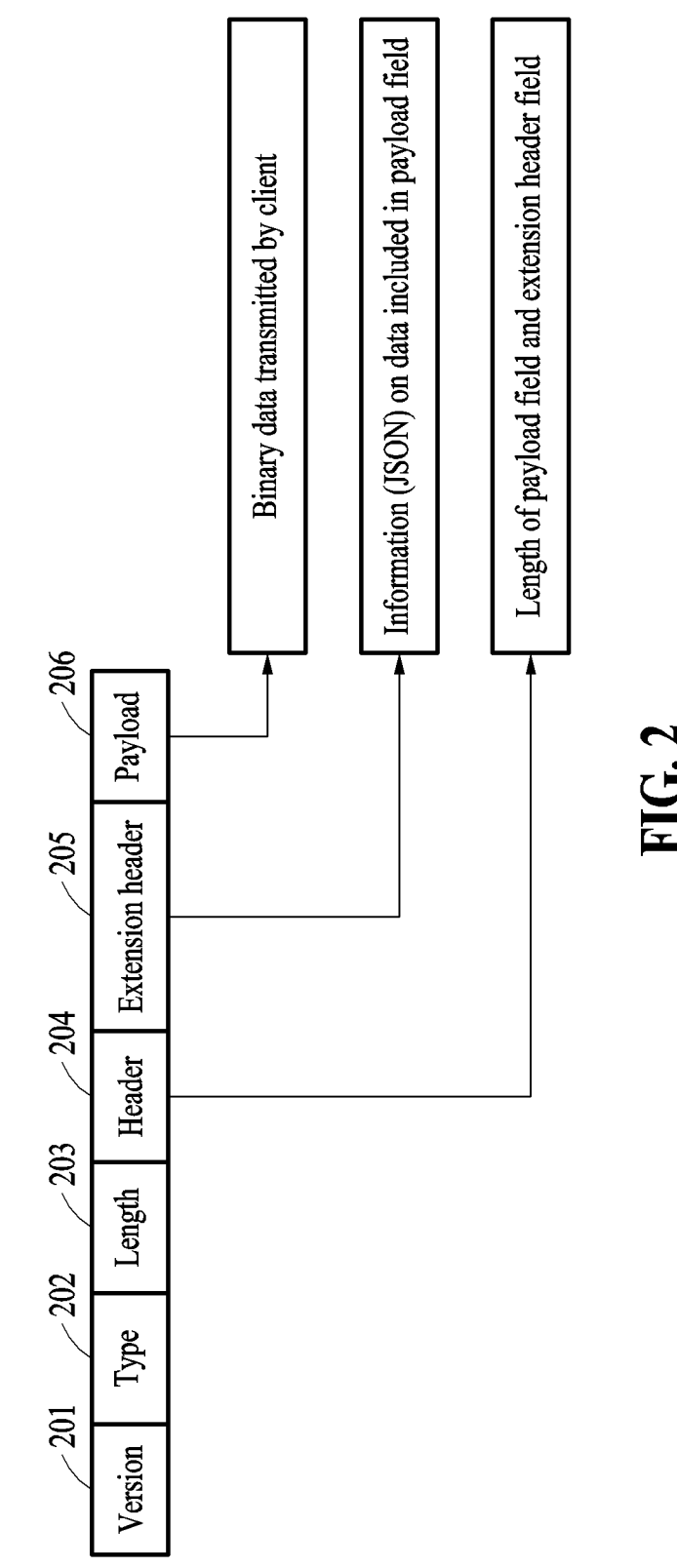
FIG. 2 is a diagram illustrating a message format for communication between distributed networking agents, according to an embodiment.

FIG. 2 is a diagram illustrating a message format for communication between distributed networking agents, according to an embodiment.

Referring to FIG. 2, a message 200 may include a version field 201, a type field 202, a length field 203, a header field 204, an extension header field 205, and a payload field 206.

The version field 201 may include information representing a version of a protocol for distributed networking. The type field 202 may include information representing an encoding type of a message. The length field 203 may include the length information of the header field 204. The header field 204 may include header information for classifying a message and may include the length information of the extension header field 205 and the length information of the payload field 206. The extension header field 205 may include information on data to be included in the payload field 206 for the message classified by the header field 204. The payload field 206 may include data to be transmitted through the message 200 and may include, for example, a key frame, a reference image, a feature, or control information as illustrated in FIG. 1.

Figure 3:
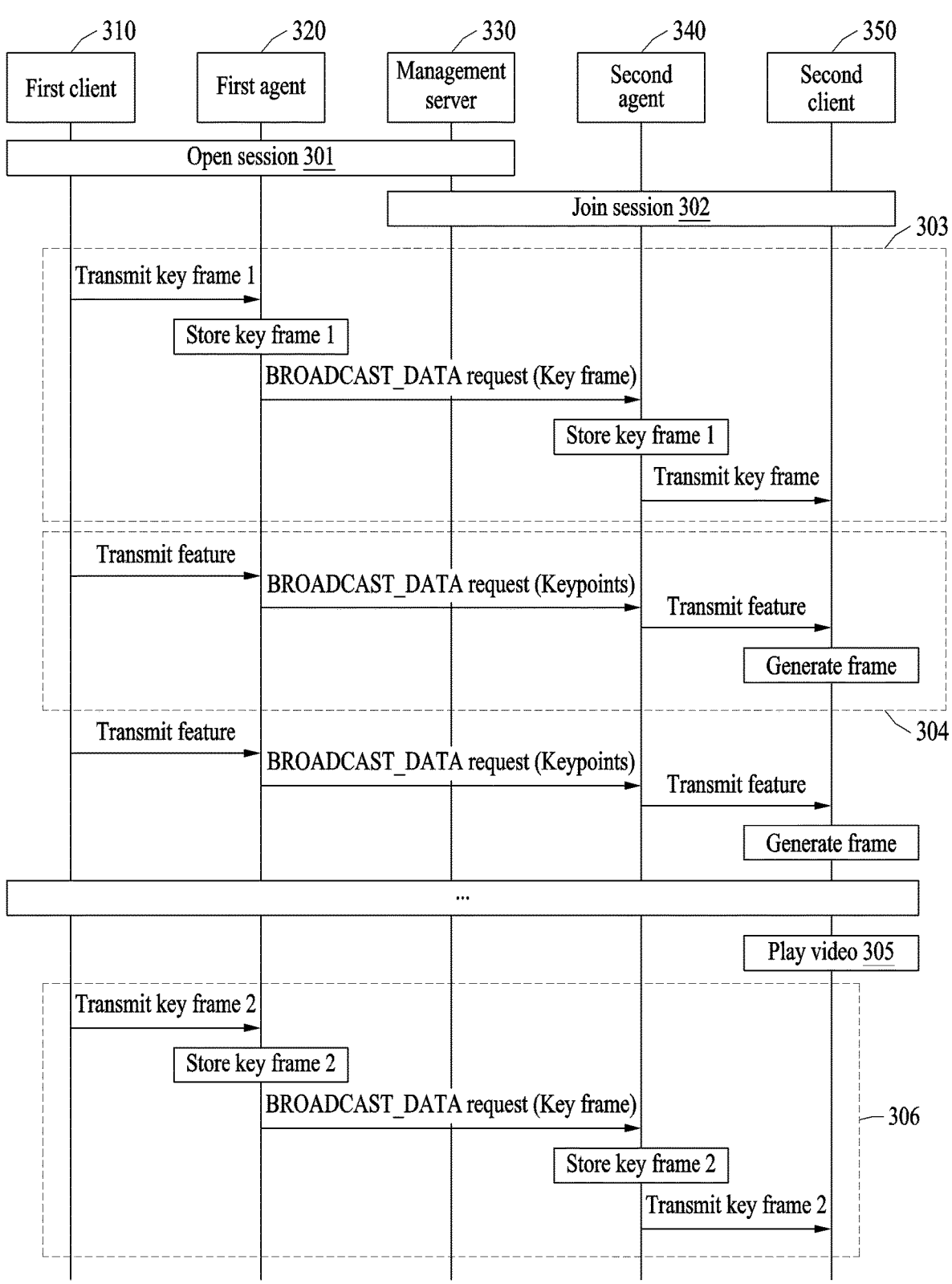
FIG. 3 is a diagram illustrating a transmission procedure of artificial intelligence-based video using a key frame and key points, according to an embodiment.

FIG. 3 is a diagram illustrating a transmission procedure of artificial intelligence-based video using a key frame and key points, according to an embodiment.

FIG. 3 illustrates operations of transmitting artificial intelligence-based video among a first client 310, a first agent 320, a management server 330, a second agent 340, and a second client 350. The artificial intelligence-based video may be transmitted from the first client 310 to the second client 350. The management server 330 may manage the state of a distributed network including the first agent 320, the second agent 340, and other agents, may manage a service session provided through the distributed network additionally, and may be, for example, a hybrid overlay management server (HOMS).

In operation 301, the first client 310 may open a session for transmitting a video by interacting with the management server 330 through the first agent 320.

In operation 302, the second client 350, intending to receive the video, may generate a distributed network between the first agent 320 and the second agent 340 by joining the session through the second agent 340.

In operation 303, the first client 310 may transmit a key frame to the first agent 320. The first agent 320 may store the received key frame and may transmit the key frame to the second agent 340 through a BROADCAST_DATA request message. The second agent 340 may store the key frame and may transmit the key frame to the second client 350. When receiving the BROADCAST_DATA request message, the second agent 340 may perform an operation to verify whether the message is the latest message or verify the integrity of the message, which is described below.

For example, a format of the BROADCAST_DATA request message may be as shown in Table 1 below.

TABLE 1

| Syntax | Description |
|---|---|
| {<br>  "req-code": NUMBER,<br>  "req-params": {<br>    "operation": {<br>      "ack": BOOLEAN<br>    },<br>    "peer": {<br>      "peer-id": STRING,<br>      "sequence": NUMBER<br>    },<br>    "payload": {<br>      "length": NUMBER,<br>      "content-type": STRING<br>    }<br>  }<br>} | - req-code indicates the type of the request message. In the case of the BROADCAST_DATA request message, req-code value is set as 6.<br>- ack has a TRUE value if the requesting peer wants to receive a response message. The default value is FALSE.<br>- peer-id indicates the ID of the peer that initially generated this BROADCAST_DATA request message, and it is possible to identify who created and sent this data for the first time.<br>- Whenever self-generated data is sent through the BROADCAST_DATA message, the value of the sequence field is increased by 1 and allocated. When forwarding data is received from another peer, this value of the sequence field is not modified.<br>- length indicates the length of the data that is carried and is described in bytes.<br>- content-type indicates the kind of data that is carried. It is described as the MIME type such as application/JSON, application/XML, etc. The processing of content according to content-type depends on the application using the peer protocol. |

In operation 304, the first client 310 may extract a feature of the next frame of the key frame as key points and may transmit the extracted feature to the first agent 320. The first agent 320 may transmit the key points to the second agent 340 through the BROADCAST_DATA request message. The second agent 340 may transmit the key points to the second client 350. The second client 350 may generate a frame based on the key points and the key frame received through operation 303.

Operation 304 described above may be performed repeatedly on the next frame. Operation 304 may be repeated until a new key frame is determined. The first client 310 may continuously transmit the key points to the second client 350 such that the video may be smoothly played in the second client 350.

In operation 305, the second client 350 may generate the video by combining the key frame with the generated frames. When the predetermined number of frames is generated, the second client 350 may generate the video by combining the frames. The second client 350 may play the generated video. When the predetermined number of frames is generated, even if the video is not received in its entirety, by playing the video generated by combining the generated frames, a multimedia streaming service may be effectively provided.

When the new key frame is generated, in operation 306, the new key frame may be transmitted from the first client 310 to the second client 350, and the description of operation 303 applies to the transmission process of the key frame, and thus, a more detailed description is omitted.

Figure 4:
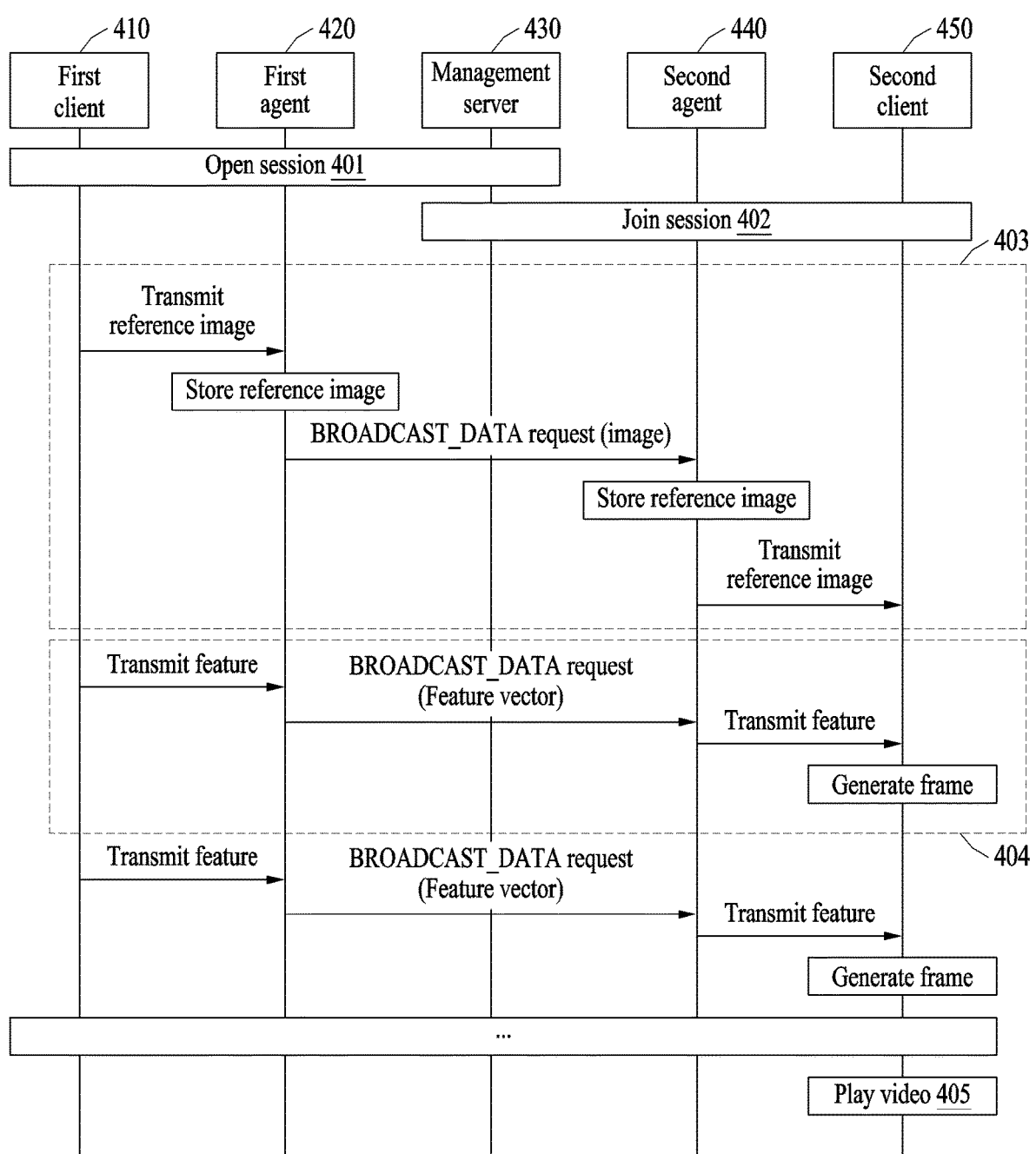
FIG. 4 is a diagram illustrating a transmission procedure of artificial intelligence-based video using a reference image and feature vectors, according to an embodiment.

FIG. 4 is a diagram illustrating a transmission procedure of artificial intelligence-based video using a reference image and feature vectors, according to an embodiment.

FIG. 4 illustrates operations of transmitting artificial intelligence-based video among a first client 410, a first agent 420, a management server 430, a second agent 440, and a second client 450. The artificial intelligence-based video may be transmitted from the first client 410 to the second client 450. The management server 430 may manage the state of a distributed network including the first agent 420, the second agent 440, and other agents, may manage a service session provided through the distributed network additionally, and may be, for example, a HOMS.

In operation 401, the first client 410 may open a session for transmitting a video by interacting with the management server 430 through the first agent 420.

In operation 402, the second client 450, intending to receive the video, may generate a distributed network between the first agent 420 and the second agent 440 by joining the session through the second agent 440.

In operation 403, the first client 410 may transmit a reference image to the first agent 420. The first agent 420 may store the received reference image and may transmit the reference image to the second agent 440 through a BROAD-CAST_DATA request message.

The second agent 440 may store the reference image. When receiving the BROADCAST_DATA request message, the second agent 440 may perform an operation to verify whether the message is the latest message or verify the integrity of the message, which is described below.

In operation 404, the first client 410 may extract a feature in a first frame of an input video in the form of a feature vector and may transmit the extracted feature to the first agent 420. The first agent 420 may transmit the feature vector to the second agent 440 through the BROADCAST_DATA request message. The second agent 440 may transmit the feature vector to the second client 450. The second client 450 may generate a frame based on the feature vector.

Operation 404 described above may be performed repeatedly on the next frame. Operation 404 may be repeated until the transmission of the feature vector for all frames is completed. The first client 410 may continuously transmit the feature vector to the second client 450 such that the video may be smoothly played in the second client 450.

In operation 405, the second client 450 may generate the video by combining generated frames. When the predetermined number of frames is generated, the second client 450 may generate the video by combining the frames. The second client 450 may play the generated video. When the predetermined number of frames is generated, even if the video is not received in its entirety, by playing the video generated by combining the generated frames, a multimedia streaming service may be effectively provided.

When the reference image is required to be changed, the first client 410 may transmit a new reference image to the second client 450 through the distributed network, and the description of operation 403 applies to the transmission process of the reference image, and thus, a more detailed description is omitted.

The second agent 440 that has received the BROAD-CAST_DATA request message may process the BROAD-CAST_DATA request message through the following procedure, and the description of the second agent 440 below also applies to the second agent 340 of FIG. 3.

First, the second agent 440 may determine whether the received message is the latest message, based on the peer ID and sequence of a header field. For example, while a peer identification (ID) of the second agent 420 is A, and a message, in which a sequence is set to 10, is received from the second agent 420, when the sequence is set to a numerical value that is less than 10, and a message, in which the peer ID is A, is received, the second agent 440 may determine that the message is not the latest message. While the peer ID of the second agent 420 is A, and the message, in which the sequence is set to 10, is received from the second agent 420, when the sequence is set to 11, and the message, in which the peer ID is A, is received, the second agent 440 may determine that the message is the latest message. The second agent 420 may discard the message that is determined to be not the latest message.

When the message is determined to be the latest message, the second agent 440 may verify the integrity of the received message. For the verification of integrity, the second agent 440 may calculate a hash value for data, excluding a digital signature, of data in a payload field. The second agent 440 may verify the integrity of the data by decrypting the digital signature in the payload field by using a public key, which has been secured in advance, of the second agent 420 and comparing the hash value with a value obtained through decryption. When the value obtained through decryption is the same as the hash value, the integrity of the data is recognized, and, when the value obtained through decryption is different from the hash value, the integrity of the data is not recognized. The public key may be transmitted to the second agent 420 while the first and second agents 420 and 440 are exchanging a SET_PRIMARY request message and a response message for the connection between the first and second agents 420 and 440.

The second agent 420 may determine whether to store the data in the payload field, based on the channel ID and media type of an extension header field. If the media type of the extension header field is set to data cache, the second agent 420 may store both the digital signature and data in the payload field. If the media type of the extension header field is set to data or control, the second agent 420 does not store any data.

The second agent 420 may transmit data based on a source ID and a sequence value when receiving a transmission request for stored data afterward by storing data based on the source ID and sequence value of the extension header field.

The second agent 420 may transmit the data excluding the digital signature to the second client 450 after storing or not storing both the digital signature and data in the payload field.

As described in detail below with reference to FIG. 7, the second agent 440 may forward the received BROADCAST_DATA request message to a child agent if there is a child agent connected to the second agent 440 itself. There may be one or more child agents.

FIG. 5 is a diagram illustrating a message format for transmitting a new image, according to an embodiment.

A peer-ID parameter in a header field may include information on a peer ID of an agent that has generated a message, and a sequence parameter in the header field may include numeric information increasing by 1 every time a BROADCAST_DATA request message is transmitted. An ext-header-len parameter in the header field may include the length information of the extension header field 205. A length parameter of a payload parameter in the header field may include the length information of a payload field, and a payload-type parameter of the payload parameter in the header field may be one of multipurpose Internet mail extensions (MIME) types and may be set to application/octet-stream referring to binary data in an 8-bit unit.

A channel-ID parameter in an extension header field may be set to a value for classifying a channel through which media are transmitted. A media-type parameter in the extension header field may be set to data cache, which may indicate that a second agent receiving a message should store and manage data in the payload field after receiving the message. A source-ID parameter in the extension header field may be a peer ID of an agent connected to a client that has generated the data in the payload field and may be set to the same value as the peer-ID parameter of the header field when a new image is transmitted. A sequence parameter in the extension header field may be numeric information for managing the sequence of images stored in the payload field, that is, key frames or reference images, and may be set to the same value as the sequence parameter of the header field.

The payload field may include key frame data generated in an application and a digital signature for a hash value of the key frame data.

In application, a first client may not forward a key frame to a first agent and may generate data including pieces of information on which application is required to be performed for the processing of the key frame, and may transmit the data together with the key frame to the first agent. The first agent may generate a hash value for the data and may digitally sign the hash value with a user's private key such that two types of data (the data, including the key frame and the processing information, generated in application and the digital signature of the hash value for the data generated in application) are included in the payload field.

FIG. 6 is a diagram illustrating a message format for transmitting a feature, according to an embodiment. Here, the feature may refer to key points or a feature vector.

A peer-ID parameter in a header field may be set to a peer ID of an agent that has generated a message, and a sequence parameter in the header field may include numeric information increasing by 1 every time a BROADCAST_DATA request message is transmitted. An ext-header-len parameter in the header field may include the length information of an extension header field. A length parameter of a payload parameter may include the length information of a payload field, and a payload-type parameter of the payload parameter may be set to application/octet-stream.

A channel-ID parameter of the extension header field may be set to a value for classifying a channel through which media are transmitted. A media-type parameter of the extension header field may be set to data.

Figure 7:
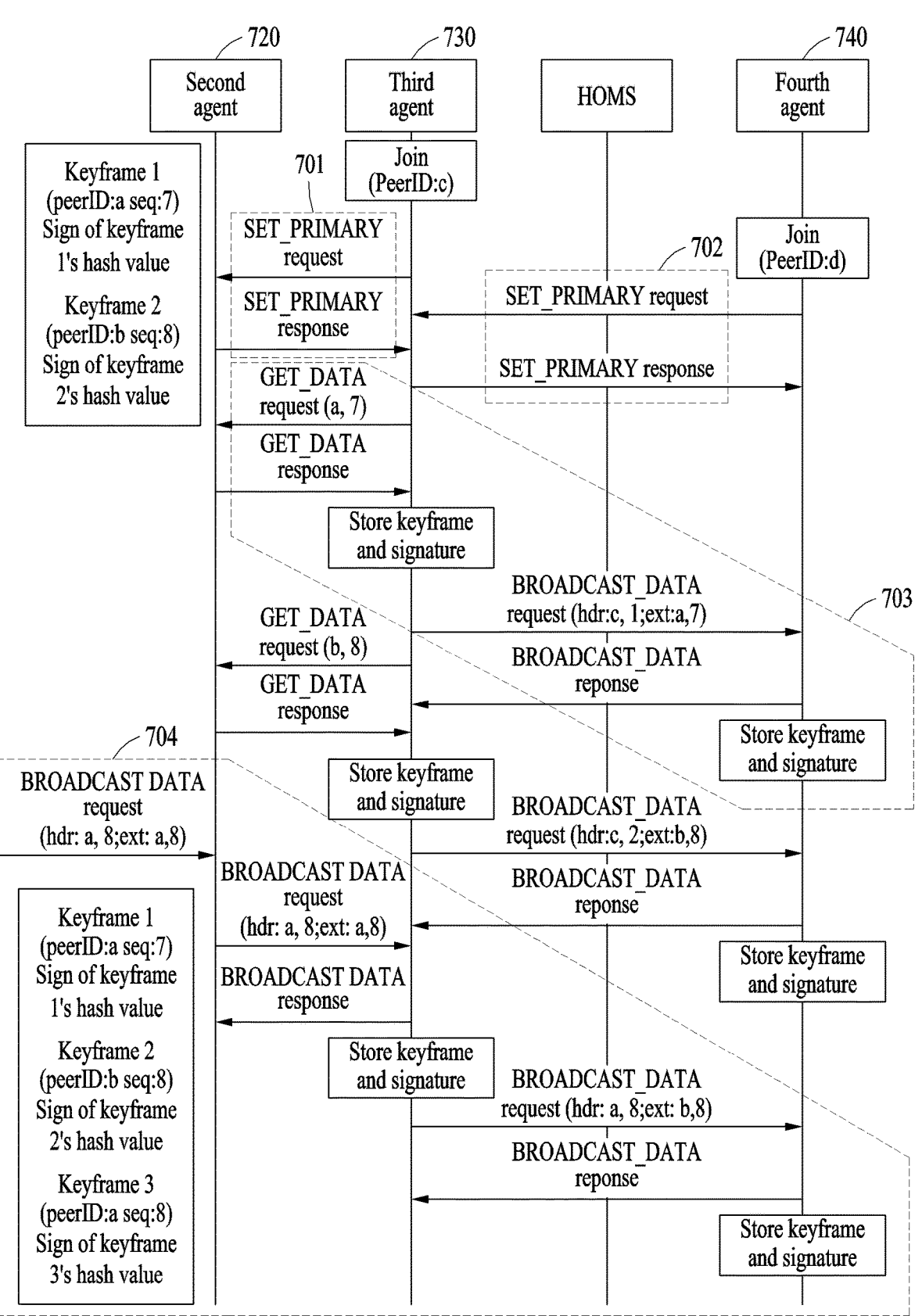
FIG. 7 is a diagram illustrating an image retransmission procedure according to an embodiment.

FIG. 7 is a diagram illustrating an image retransmission procedure according to an embodiment.

FIG. 7 illustrates image retransmission operations performed when a new user joins a distributed network. Referring to FIG. 7, for ease of description, operations performed between agents are mainly described, and it is assumed that a second agent 720 has already joined the distributed network, and a third agent 730 and a fourth agent 740 have newly joined the distributed network. In addition, the second agent 720 may store two images, and the two images may be a seventh image transmitted by an agent, in which a peer ID is a, and an eighth image transmitted by an agent, in which a peer ID is b. An image may be a key frame or a reference image.

In operation 701, the third agent 730 may exchange a SET_PRIMARY request message and a SET_PRIMARY response message with the second agent 720 to secure a connection for data reception.

During this process, in operation 702, the fourth agent 740 may exchange the SET_PRIMARY request message and the SET_PRIMARY response message with the third agent 730 to secure a connection for data reception. The fourth agent 740 may identify that the third agent 730 does not store any image through the SET_PRIMARY response message received from the third agent 730 and may stop an additional operation.

In operation 703, the third agent 730 may confirm the SET_PRIMARY response message received from the second agent 720 and may exchange a GET_DATA request message and a GET_DATA response message with the second agent 720 to request the transmission of images retained by the second agent 720. When receiving the GET_DATA response message, including an image and a digital signature, from the second agent 720, the third agent 730 may store the image and the digital signature. The third agent 730 may generate a BROADCAST_DATA request message, including the image and the digital signature, and may transmit the message to the fourth agent 740. When receiving the BROADCAST_DATA request message, the fourth agent 740 may operate according to the processing procedure upon the receipt of the BROADCAST_DATA request message as described above.

The description of operation 703 applies to the eighth image transmitted by the agent, in which the peer ID is b, and thus, a more detailed description is omitted.

Operation 704 may be a general image propagation operation. When receiving the BROADCAST_DATA request message including an eighth key frame transmitted by the agent, in which the peer ID is a, from an upper agent (e.g., a first agent 320 of FIG. 3) of the second agent 720, the second agent 720 may verify the integrity of the message, may store the key frame and a signature for a hash value of the key frame, and then, may transmit the received BROADCAST_DATA request message to the third agent 730. The third agent 730 may also verify the integrity of the received message, may store the key frame and the signature for the hash value of the key frame, and then, may transmit the received BROADCAST_DATA request message to a fourth agent 840. The fourth agent 840 may verify the integrity of the received message and may store the key frame and the signature for the hash value of the key frame.

FIG. 8 is a diagram illustrating a SET_PRIMARY response message format for retransmitting an image, according to an embodiment.

A SET_PRIMARY request message and the SET_PRIMARY response message may be used to establish a connection between agents, and, specifically, the SET_PRIMARY response message may be used to notify the information of another agent included in the SET_PRIMARY request message.

Agent information set in an extension header field may be managed in a peer unit, and the following information may be provided for each peer.

A peer ID may be set as the peer ID used by an agent. A display name refers to a username set for a client corresponding to the agent and may be set as the username displayed in a service. A public key may be set according to whether the user of the client corresponding to the agent retains the public key. If the agent includes the public key, the public key may be set to true and the public key may be included in a payload field. Cache data is set when data transmitted from the agent is stored and may be configured as a pair of a channel ID and a sequence. The channel ID may be set to a channel ID value, and the sequence may include the numeric information of the stored data.

The numeric information in the sequence may be set as below.

When receiving the data as a BROADCAST_DATA request message, the numeric information in the sequence may be set to a value of source-ID and sequence parameters in an extension header field of the BROADCAST_DATA request message. When receiving the data as a GET_DATA response message, the numeric information in the sequence may be set to a value of peer-ID and sequence parameters in a header field of the GET_DATA response message. This is to manage data, which is received from another agent and stored, according to the peer ID and sequence of an agent that has originally generated the data, as described above.

If data on each channel for one agent is stored, a cache-data parameter may include multiple pairs. For example, when assuming a teleconferencing session, there may be a voice channel, a video channel, and a chat channel. Among these, the video channel may include one or more transmission agents, and the one or more transmission agents may each transmit their own video, and thus, each reception agent that has joined the video channel may store data (e.g., video) for each transmission agent transmitting the video. In the expression "If data on each channel for one agent is stored", "for one agent" is derived from "peers": [ ] representing an array of peers (i.e., agents) in the syntax shown in FIG. 8, and "data on each channel . . . is stored" is derived from a cached-data parameter for each peer representing a cached-data array as "cached-data": [ ], the inside of which is classified by a channel ID.

For example, if a peer, of which the peer ID is a, transmits data to be stored for two channels, of which the channel IDs are 1 and 2, the extension header field may be expressed as below:

```
"peers" : [{"peer-id": "a",
    "display-name" : "example name",
    "public-key": true,
    "cached-data": [{"channel-id":"1", "sequence":8},
        {"channel-id":"2", "sequence":10}]
    }]
```

FIG. 9 is a diagram illustrating a GET_DATA request message format for retransmitting an image, according to an embodiment.

A reception agent that receives a SET_PRIMARY response message may determine whether a transmission agent that transmits the SET_PRIMARY response message stores data that is not retained by the reception agent, based on a cache-data parameter set for an extension header field of the message. When confirming that the transmission agent has the data that is not retained by the reception agent, the reception data may request the transmission of the data to the transmission agent by using the GET_DATA request message.

A source ID of a header field of the GET_DATA request message may be set to a peer ID of an agent that has originally generated the data of which the transmission is requested. The source ID may be set to a value of a peer ID parameter of the extension header field of the SET_PRI-MARY response message. A sequence parameter may be set to a value of the sequence parameter of the extension header field.

Since the GET_DATA request message does not include a payload field, the header field does not include a payload parameter.

A channel-ID parameter of the extended header field may be set to a channel-ID value of the extension header field of the SET_PRIMARY response message.

FIG. 10 is a diagram illustrating a GET_DATA response message format for retransmitting an image, according to an embodiment.

With a peer ID of a header field set to a source ID of the header field of a GET_DATA request message and a sequence of the header field set to a sequence of the header field of the GET_DATA request message, the peer ID and the sequence may be set such that the transmission of requested data is indicated.

A channel-ID parameter of an extension header field may be set to a channel ID of the extension header field of the GET_DATA request message, and a media-type parameter may be set to data cache.

A payload field may include a requested image and an original digital signature of the image.

FIG. 11 is a diagram illustrating a BROADCAST_DATA request message format for retransmitting an image, according to an embodiment.

If a reception agent that receives the image through a GET_DATA response message has a child agent, the reception agent may generate the BROADCAST_DATA request message and may transmit the received image and an original digital signature to the child agent.

A peer-ID parameter of a header field may be set to a peer ID of an agent that has generated the BROADCAST_DATA request message. A sequence parameter of the header field may be set to a sequence number of the BROADCAST_DATA request message. For example, the sequence parameter may be set to 1 when it is a first BROADCAST_DATA request message, and the numerical value may increase by one for every next BROADCAST_DATA request message. For example, the sequence parameter of a third BROADCAST_DATA request message may be set to 3.

A channel ID of an extension header field may be set to a channel-ID parameter value of the extension header field of the GET_DATA response message, and a media-type parameter of the extension header field may be set to data cache. A source ID may be set to a peer ID of a header field of the GET_DATA response message, and a sequence may be set to the sequence of the header field of the GET_DATA response message.

A payload field may include data stored in the payload field of the GET_DATA response message as it is.

Figure 12:
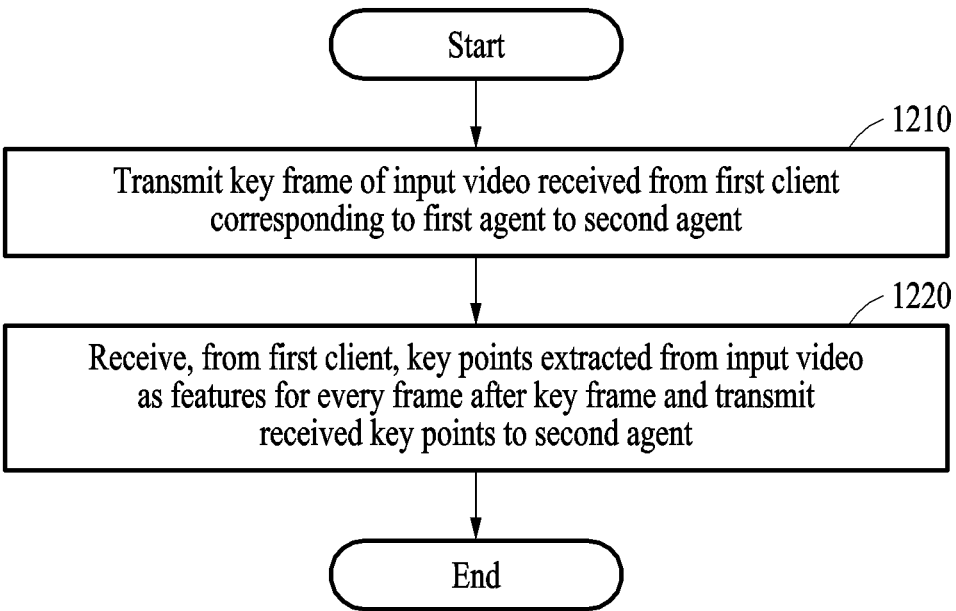
FIG. 12 is a diagram illustrating an operating method of an agent based on a key frame and key points, according to an embodiment.

FIG. 12 is a diagram illustrating an operating method of an agent based on a key frame and key points, according to an embodiment.

In operation 1210, a first agent may transmit a key frame of an input video received from a first client corresponding to the first agent to a second agent. The key frame may be a first frame when an angle and/or position of an object included in the input video changes. The key points may include a coordinate value for at least one of an eye, nose, mouth, ear, or jawline of a face included in the input video.

In operation 1220, the first agent may receive, from the first client, key points extracted from the input video as features for every frame after the key frame and may transmit the received key points to the second agent.

The first agent and the second agent communicate through a distributed network.

The first agent may open a session for video transmission between the first client and HOMS for managing the first agent and the second agent. A distributed network between the first agent and the second agent may be generated in response to the second agent joining the session.

A second client corresponding to the second agent may generate the input video based on the key frame and a frame generated from the key points received through the second agent.

The descriptions provided above with reference to FIGS. 1 to 11 also apply to the operations illustrated in FIG. 12, and thus, a more detailed description is omitted.

Figure 13:
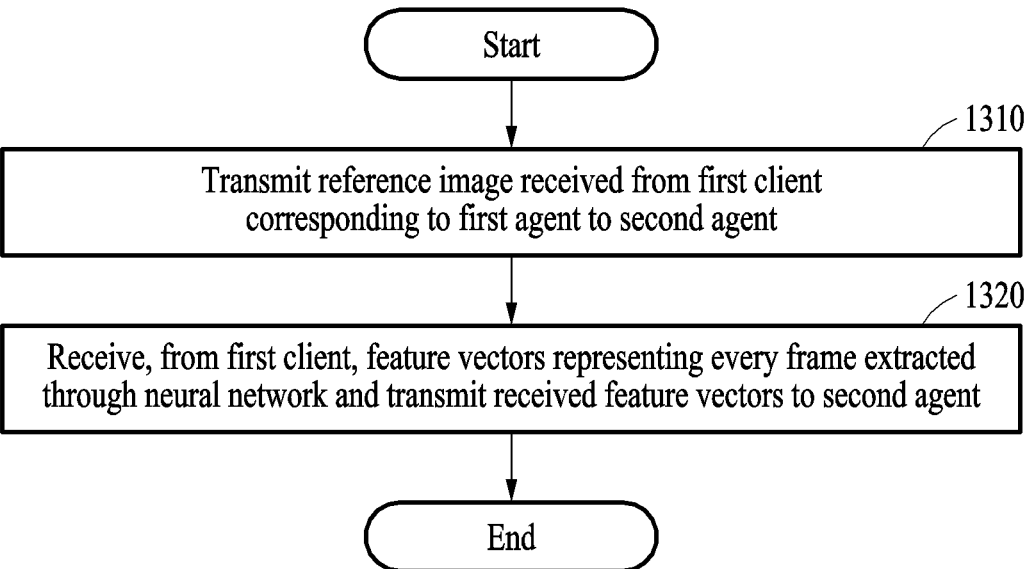
FIG. 13 is a diagram illustrating an operating method of an agent based on a reference image and feature vectors, according to an embodiment.

FIG. 13 is a diagram illustrating an operating method of an agent based on a reference image and feature vectors, according to an embodiment.

In operation 1310, a first agent may transmit a reference image received from a first client corresponding to the first agent to a second agent.

In operation 1320, the first agent may receive, from the first client, feature vectors representing every frame extracted through a neural network and may transmit the received feature vectors to the second agent.

The first agent and the second agent communicate through a distributed network.

The second agent may determine whether a message is the latest message based on a sequence and peer ID of a header field of the message received from the first agent, may discard the message when the message is not the latest message, may verify the integrity of data in a payload field of the message when the message is the latest message, may determine whether to store the data in the payload field of the message based on a media type and channel ID of an extension header field of the message in response to the integrity of the data being verified, and may transmit data, excluding a digital signature, of the data in the payload field to a second client. The verifying of the integrity of the data may include calculating a hash value for the data, excluding a digital signature, of the data in the payload field of the message, decrypting the digital signature in the payload field by using a public key of the first agent, and verifying the integrity of the data based on whether a result of decrypting the digital signature is the same as the hash value.

The public key may be transmitted from the first agent to the second agent while the first agent and the second agent are exchanging a SET_PRIMARY request message and a SET_PRIMARY response message.

The determining whether to store the data in the payload field of the message may include storing a digital signature and the data in the payload field when the media type is set to data cache and not storing the data in the payload field when the media type is set to data or control.

If there is a child agent of the second agent, the second agent may forward a message received from the first agent to the child agent.

When a new third agent accesses the distributed network, the third agent may transmit a SET_PRIMARY request message to the second agent, may receive, from the second agent, a SET_PRIMARY response message corresponding to the SET_PRIMARY request message, may transmit a GET_DATA request message requesting the transmission of videos retained by the second agent, based on the SET_PRI-MARY response message, may receive, from the second agent, a GET_DATA response message according to the GET_DATA request message, and may store a video and a digital signature included in the GET_DATA response message. The third agent may enter a waiting state when confirming that the second agent does not retain any video, based on the SET_PRIMARY response message.

The descriptions provided above with reference to FIGS. 1 to 12 also apply to the operations illustrated in FIG. 13, and thus, a more detailed description is omitted.

Figure 14:
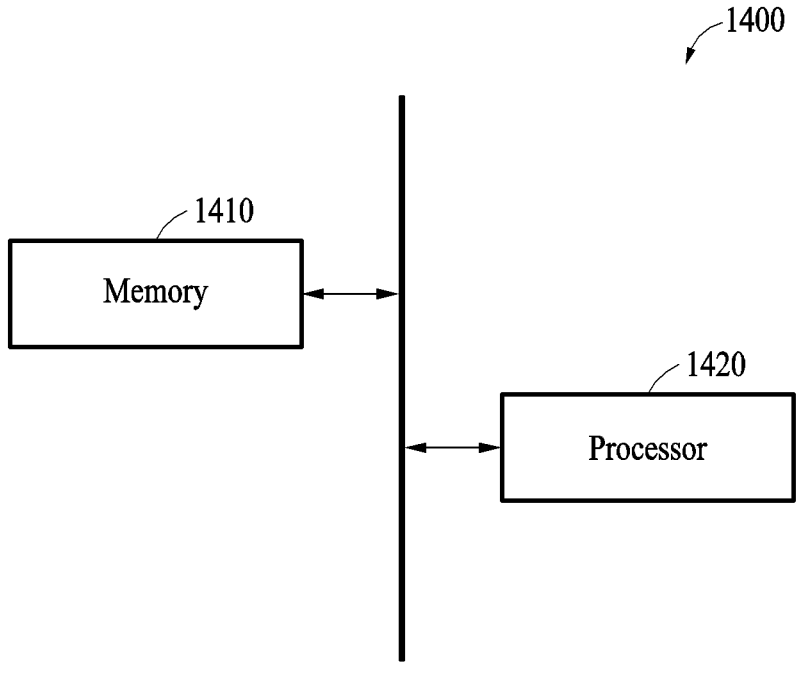
FIG. 14 is a diagram illustrating a communication device according to an embodiment.

FIG. 14 is a diagram illustrating a communication device according to an embodiment.

Referring to FIG. 14, a communication device 1400, according to an embodiment, may include a memory 1410 and a processor 1420.

The memory 1410 may include computer-readable instructions. When an instruction stored in the memory 1410 is implemented by the processor 1420, the processor 1420 may perform the operations described above. The memory 1410 may include, for example, a volatile memory or a non-volatile memory.

The processor 1420 may be a device that executes instructions or programs or controls the communication device 1400 and may include, for example, a central processing unit (CPU), a graphics processing unit (GPU), or the like.

The communication device 1400 may perform the operations of a client and/or an agent as described above. The communication device 1400 may include, for example, various computing devices, such as a mobile phone, a smartphone, a tablet personal computer (PC), an e-book device, a laptop, a PC, a desktop, a workstation, or a server, various wearable devices, such as a smart watch, smart eyeglasses, a head-mounted display (HMD), or smart clothing, various home appliances such as a smart speaker, a smart television (TV), or a smart refrigerator, and other devices, such as a smart vehicle, a smart kiosk, an Internet of things (IoT) device, a walking assist device (WAD), a drone, or a robot.

In addition, the communication device 1400 may process the operations described above.

The examples described herein may be implemented by using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing unit also may access, store, manipulate, process, and generate data in response to execution of the software. For purpose of simplicity, the description of a processing unit is used as singular; however, one skilled in the art will appreciate that a processing unit may include multiple processing elements and multiple types of processing elements. For example, the processing unit may include a plurality of processors, or a single processor and a single controller. In addition, different processing configurations are possible, such as parallel processors.

The software may include a computer program, a piece of code, an instruction, or some combination thereof, to independently or collectively instruct or configure the processing unit to operate as desired. Software and data may be stored in any type of machine, component, physical or virtual equipment, or computer storage medium or device capable of providing instructions or data to or being interpreted by the processing unit. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other examples, and equivalents to the claims are also within the scope of the following claims.

What is claimed is:

1. An operating method of a first agent, the operating method comprising:

transmitting a message including a key frame of an input video received from a first client corresponding to the first agent to a second agent; and receiving, from the first client, key points extracted from the input video as features for every frame after the key frame and transmitting the received key points to the second agent, wherein the first agent and the second agent communicate through a distributed network, wherein the message includes:

a version field including information representing a version of a protocol for a distributed networking;

a type field including information representing an encoding type of the message;

a length field including length information of a header field;

the header field including header information for classifying the message and length information of an extension header field and a payload field;

the extension header field including information of a binary data contained in the payload field; and the payload field including one of the key frame, the key points, or control data for a session for transmission of the input video, wherein the input video is generated based on the key frame and a frame generated from the key points received through the second agent by a second client corresponding to the second agent.

2. The operating method of claim 1, wherein the key frame is a first frame when an angle and/or position of an object comprised in the input video changes.

3. The operating method of claim 1, wherein the key points comprise a coordinate value for at least one of an eye, nose, mouth, ear, or jawline of a face comprised in the input video.

4. The operating method of claim 1, further comprising opening a session for video transmission between the first client and a hybrid overlay management server (HOMS) configured to manage the first agent and the second agent, wherein a distributed network between the first agent and the second agent is generated in response to the second agent joining the session.

5. A non-transitory computer-readable storage medium storing instructions that, when executed by a processor, cause the processor to perform the operating method of claim 1.

6. A first agent comprising one or more processors, wherein the one or more processors are configured to:

transmit a message including a key frame of an input video received from a first client corresponding to the first agent to a second agent, and receive, from the first client, key points extracted from the input video as features for every frame after the key frame and transmit the received key points to the second agent, wherein the first agent and the second agent communicate through a distributed network, wherein the message includes:

a version field including information representing a version of a protocol for a distributed networking;

a type field including information representing an encoding type of the message;

a length field including length information of a header field;

the header field including header information for classifying the message and length information of an extension header field and a payload field;

the extension header field including information of a binary data contained in the payload field; and the payload field including one of the key frame, the key points, or control data for a session for transmission of the input video, wherein the input video is generated based on the key frame and a frame generated from the key points received through the second agent by a second client corresponding to the second agent.

7. The first agent of claim 6, wherein the key frame is a first frame when an angle and/or position of an object comprised in the input video changes.

8. The first agent of claim 6, wherein the key points comprise a coordinate value for at least one of an eye, nose, mouth, ear, or jawline of a face comprised in the input video.

9. The first agent of claim 6, wherein the one or more processors are further configured to open a session for video transmission between the first client and a hybrid overlay management server (HOMS) configured to manage the first agent and the second agent, wherein a distributed network between the first agent and the second agent is generated in response to the second agent joining the session.

10. The operating method of claim 1, wherein the payload field further includes a signature for a hash value of the key frame.

* * * * *